United States Patent Office 2,722,498
Patented Nov. 1, 1955

2,722,498

PROCESS FOR SEPARATING ORGANIC MATERIAL FROM INORGANIC MATERIAL

Charles E. Morrell and Paul V. Smith, Jr., Westfield, N. J., assignors to Esso Research and Engineering Company, a corporation of Delaware No Drawing. Application September 30, 1950, Serial No. 187,843

3 Claims. (Cl. 196—14)

This invention concerns a novel process permitting the separation of organic chemical constituents from solid inorganic material with which it may be associated. In accordance with this invention, the pulverized or finely divided inorganic material, containing organic material to be extracted is subjected to the action of a suitable organic solvent while being submitted to the action of compressional waves. This technique results in the extraction of a substantial portion of the organic material contained in the inorganic material treated.

While, as indicated, this invention is broadly of application to the extraction of any organic type chemical from solid inorganic material, the invention is of particular application to the extraction of hydrocarbons or other carbon containing, non-carbonate material, from sedimentary material which may or may not be associated with the occurrence of petroleum. As the geologic term "sedimentary material" is used herein, the term embraces sediment deposited at the bottom of the oceans, shale, sandstone, etc. Thus, an important application of the process of this invention concerns the identification of source rocks for petroleum with a particular crude oil itself. By establishing a chemical relationship between the residual organic material contained in the source rock and crude oil produced in a nearby well, valuable information is obtained. Again, in the study of the production and occurrence of petroleum oil, it is valuable to extract organic material from sedimentary material such as that accumulating at portions of the ocean bed. For these and other reasons, the development of a suitable manner of extracting organic material from sedimentary material is of interest.

The problem of segregating the organic material contained in a shale or sediment is complicated by the fact that relatively low concentrations of the organic material exists. Consequently, it is practically necessary to secure substantial extraction of the organic material in order to be able to secure useful information by this general process. Heretofore, many attempts have been made to develop suitable methods for securing the desired separation. For example, froth flotation, gravity separation employing a brine solution, or treatment with scores of different solvents has been attempted. However, all of these and the other methods attempted are subject to the disadvantage that only minor fractions of the organic material can be segregated, and furthermore, chemical degradation of complex organic molecules frequently occurs. Consequently, it is the principal object of this invention to secure the extraction of greater proportions of organic material from sedimentary material than heretofore possible without causing the chemical degradation or chemical conversion of the organic material originally present.

In accordance with this invention, it has been discovered that these objectives may be achieved by employing certain particular solvents and by subjecting a mixture of solvent and sedimentary material to the action of compressional waves. As will be shown, the extraction process, depending upon the combined action of the particular solvents and the compressional waves, causes extraction results unobtainable by other methods.

As indicated therefore, the process of this invention depends on the utilization of a suitable solvent and depends upon the application during solvent treatment of suitable compressional waves. In describing this process, reference will first be made to the nature of the compressional waves required in the process.

Compressional waves of the nature required are often termed "acoustic waves," describing a longitudinal wave motion consisting of waves of alternate compression and rarefaction which are propagated through fluid medium. In general, the nature of "acoustic waves" or "compressional waves" is described in connection with the frequency of the waves as being within the sonic or the so-called ultrasonic range. Thus, sonic compressional waves are characterized by frequencies varying from a few cycles per second to about 15,000 or 16,000 cycles per second corresponding to the audible range, while ultrasonic compressional waves have higher frequencies extending up to and including the magnitude of frequencies employed in radio transmission. In the practice of this invention, compressional waves of any desired frequency in either the sonic or ultrasonic ranges may be employed.

However, regardless of the frequency of compressional waves employed, a critical requirement is that sufficient power be provided in the propagation of the compressional waves so that "cavitation" results. Cavitation is a phenomenon characterized by the rupture of a liquid medium causing the production of gas and chemical decomposition products. The nature of cavitation is thus quite similar to the formation of gas bubbles in a boiling liquid. This phenomenon is readily observable if a vibrating plate, for example, operated at sufficiently high power levels is immersed in a liquid bath. Vibration of the plate causes the propagation of compressional waves through the liquid. When sufficient power is imparted to the driving of the plate, it will be found that bubbles are formed in the liquid on and adjacent the vibrating plate. These bubbles are caused by cavitation effects corresponding to the production of localized zones of rarefaction sufficient in magnitude to cause the actual conversion of liquid to gas in these zones. While, as will be shown, many methods may be employed for developing the compressional waves required for the process of this invention, as indicated, it is essential that the method employed be capable of providing cavitation. As indicated, the attainment of cavitation conditions is solely dependent on securing a compressional wave source of sufficiently high power output.

At the present state of the art, many methods are known for developing high power output compressional waves. A simple method which may be employed, particularly for sonic compressional wave production, depends upon the vibration of a metal diaphragm. By employing a solenoid, for example to drive the diaphragm, it is practical to develop compressional waves suitable for the practice of this invention. Alternately, magnetostrictive types of compressional wave generators may be employed. Magnetostrictive generators depend upon the property of certain metals such as nickel, to vary in length under the influence of an electro-magnetic field. Consequently, by placing a solenoid coil around a tube of magnetostrictive material and by supplying an A. C. voltage to the solenoid coil having a frequency corresponding to the resonant frequency of the tube, compressional waves will be developed. Magnetostrictive generators of this general character are particularly adaptable to the production of compressional waves having frequencies of about 5,000 to 60,000 cycles per second. Still another type of generator which may be employed depends upon the utilization of piezoelectric materials. Materials such as quartz and certain synthetic crystals possess piezoelectric properties resulting in the production of compressional waves when the crystals are subjected to an A. C. voltage, preferably having a frequency corresponding to the resonant frequency of the crystals. Piezoelectric compressional wave generators are of particular application to the production of supersonic compressional waves ranging in frequency from 200 kilocycles to about 5 megacycles, or somewhat higher. Since suitable compressional wave generators are well-known to the art and are not a part of this invention, no further description of these generators appears necessary.

As described heretofore, in the practice of this invention, the inorganic material from which organic material is to be extracted is subjected to the action of compressional waves in a bath of a suitable solvent. The source of compressional waves may be chosen as desired to provide any desired frequency of compressional waves provided the source is capable of sufficient power output to cause cavitation.

The solvent to be employed is most broadly, an organic solvent. The more polar organic compounds such as the alcohols, nitrocompounds and pyridine are most effective, although less polar compounds may be employed. Nonpolar materials such as hydrocarbons, chlorinated compounds and carbon disulfide are relatively ineffective in treating certain sediments but entirely suitable in treating other sediments. In considering the nature of the solvent to be employed, it is particularly notable that water or aqueous solvents such as sulfuric acid or hydrochloric acid are unsuitable. Aqueous solutions of acetic acid, propionic acid, methanol and ethanol fall in this same class. Each of these materials has the characteristic of causing the extraction of large amounts of inorganic material as well as organic material so that the desired segregation of organic material from inorganic material cannot be achieved.

It is important to observe that while preferred solvents may be found for the extraction of organic material from any particular sedimentary material, different solvents may be preferable for the treatment of different types of sedimentary material. The best generalization concerning the nature of the solvent, therefore, is that it is to be chosen from alcohols, ketones, esters, ethers, alkyl halides, hydrocarbons, and nitrocarbons containing no aliphatic olefinic unsaturation and boiling between approximately 30 to 130° C. Other solvents which may be employed are pyridine, carbon disulfide, and combination molecules such as the chloro-alcohols and the ether-alcohols.

In utilizing a solvent of the nature identified, particularly desirable results may be obtained by employing a plural stage solvent treatment. Thus, in a typical case, a second stage treatment with a particular solvent resulted in the extraction of 70% as much organic material as was extracted in a first-stage treatment. Again, a third-stage treatment resulted in the separation of 56% as much organic material as was obtained in the first-stage extraction. Consequently, it is desirable in the practice of this invention to employ more than one stage of solvent treating.

Another important factor concerning the employment of the solvent to secure selective extraction of organic material concerns the use of a combination of solvents. It has been found that when inorganic material is subjected to compressional waves in the presence of different solvents, different solvents act selectively to extract different organic materials. Thus, by employing a combination of two or more solvents, it is possible to secure a co-action between the different solvents so as to selectively extend the extraction of the organic material from the inorganic material.

Prior to employing the extraction process of this invention, it is desirable to pulverize the sedimentary material to be extracted so as to reduce it to a fine particle size. This materially facilitates the subsequent extraction of the organic material.

The process characterized in the preceding discussion may be more readily appreciated from the following examples exemplifying and characterizing the critical process variables. In all of the experiments reported, the sedimentary material treated was first reduced to a particle size of about 1 micron by the action of a micropulverizer.

EXAMPLE 1

A shale sample obtained from a point 3400 ft. above the base of the Green River formation in Duchene County, Utah, was employed in a variety of extraction experiments. In a first series of tests, this shale was subjected to the action of carbon tetrachloride in a Soxhlet extractor. The extraction was conducted over a period of 15 hours employing 50 mls. of carbon tetrachloride and 2 grams of shale. It was found that 5% of organic material was removed by this treatment.

EXAMPLE 2

The shale sample employed in Example 1 was subjected to the process of this invention employing the same solvent, carbon tetrachloride, as employed in Example 1. A piezoelectric compressional wave generator was employed operating at 1500 kilocycles on an electrical power input of 0.6 kilowatts. Under these conditions, the compressional wave generator produced compressional waves causing cavitation. In exposing a sample of shale and solvent having the weight relation given in Example 1 to these compressional waves for a period of five minutes, and on then filtering the shale from the solvent, it was found that 49.8% of organic material had been extracted. This same experiment was repeated under the identical conditions except that the frequency of the compressional waves was changed to 700 kilocycles. It was again found that 49.8% of organic material was extracted. This data indicates that extraction of organic material from an inorganic material such as shale is relatively ineffective by utilization of solvent action alone. However, when employing a solvent in the presence of compressional waves of sufficient intensity to provide cavitation, the amount of organic material which can be extracted is remarkably increased.

EXAMPLE 3

This conclusion is further borne out by a series of tests concerning the extraction of organic material from a sediment obtained from the floor of the Gulf of Mexico off Freeport, Texas. The organic carbon content of this sediment was 0.53% corresponding to 0.69% organic matter. Different solvents were employed to extract this organic material. For comparative purposes, the particular solvent was employed in a Soxhlet extractor for a period of 15 hours and in the presence of compressional waves for a period of 10 minutes. 250 ml. of solvent and 20 grams of sediment were employed when using the Soxhlet extractor, while 100 ml. of solvent and 20 grams of sediment were employed when compressional waves were used. The generator employed was a piezo-electric generator operated at 400 kilocycles on an electrical input of about 600 watts, producing cavitation in each case. The results of these experiments are shown in the following table:

*Extraction of Gulf of Mexico sediment*

| Solvent | Percent Organic Matter Extracted | |
|---|---|---|
| | Soxhlet | Ultrasonic |
| Benzene | 1.2 | 3.4 |
| Chloroform | 1.4 | 3.5 |
| Carbon Disulfide | 0.4 | 2.8 |
| Methyl ethyl ketone | 6.8 | 10.3 |
| n-Butanol | 8.2 | 24.0 |
| Ethyl acetate | 2.0 | 5.4 |
| Nitromethane | 12.7 | 28.9 |

The data of this table again bears out the material increase in the amount of organic material which can be extracted by employing compressional waves during the extraction. In the case of each solvent employed, with one exception, more than twice the quantity of material could be extracted by employing the technique of the invention as compared to treatment in a Soxhlet extractor. This is particularly striking since the time required to secure this result was only 1/90 of the time employed in the Soxhlet extractions.

EXAMPLE 4

Additional experiments were conducted to evaluate different solvents. In these experiments, the sediment employed was that used in Example 3 and the same proportion of solvent and sedimentary material was used. Compressional waves having a frequency of 400 kilocycles and of sufficient intensity to provide cavitation were employed. The amount of organic material extracted in a period of 10 minutes was determined by filtering the solvent-sediment mixture and by analysis of the resulting filtrate. The results of these experiments are indicated in the following table:

*Extraction of Gulf of Mexico sediment*

| Solvent | Percent Organic Matter Extracted | Solvent | Percent Organic Matter Extracted |
|---|---|---|---|
| Alcohols: | | Hydrocarbons: | |
| Methanol | [1] 56.0 | Heptane | 1.1 |
| 95% Ethanol | [1] 38.0 | Cyclohexane | 3.2 |
| 100% Ethanol | 26.2 | Benzene | 3.4 |
| Isopropanol | 13.1 | Toluene | 3.4 |
| n-Butanol | 23.9 | Xylene | 2.6 |
| Cyclohexanol | 9.5 | Chlorinated Compounds: | |
| Ketones: | | Chloroform | 3.5 |
| Acetone | 6.9 | Carbon tetrachloride | 1.8 |
| Methyl ethyl ketone | 10.3 | Ethylene dichloride | 2.2 |
| Ethers: | | Nitro Compounds: | |
| Isopropyl ether | 4.6 | Nitromethane | 28.9 |
| Dioxane | 7.0 | Nitroethane | 18.6 |
| Ester: Ethyl acetate | 5.4 | 1-Nitropropane | 28.2 |
| Amines: | | 2-Nitropropane | 14.7 |
| Pyridine | 11.4 | Nitrobenzene | 4.6 |
| Aniline | [2] 71.9 | Acids: | |
| Morpholine | ([2]) | Acetic | |
| Ethanolamine | [2] 54.7 | Propionic | ([3]) |
| Ethylene diamine | ([2]) | 20% Sulfuric | |
| | | 20% Hydrochloric | |
| | | Miscellaneous: | |
| | | Carbon disulfide | 2.8 |
| | | Water | [1] 54.5 |

[1] Inorganic material extracted.
[2] Apparent solvent degradation.
[3] Results obscured by large amount of inorganic matter extracted.

It will be noted from this table that alcohols, nitro-compounds and amines are generally most suitable for the extraction of organic materials from this particular sedimentary material.

EXAMPLE 5

The selectivity of different solvents for the extraction of organic material in the presence of compressional waves providing cavitation was demonstrated in a series of tests employing four different solvents. In each test, a 20 gram sample of sediment obtained from the floor of the Gulf of Mexico was extracted with 100 cc. portions of the particular solvent. The extraction was conducted while subjecting the mixture of solvent and sediment to the action of compressional waves having a frequency of 400 kilocycles and having sufficient intensity to provide cavitation. The results of these tests are indicated in the following table: Column of this table headed "Stepwise" shows the amount of organic material extracted on successive extractions with the solvents listed. Column 2 of the table headed "Fresh Sediment" shows the amount of organic material extracted when a fresh sample of sediment was subjected to the action of the particular solvent.

| Solvent | Percent Organic Matter Extracted | |
|---|---|---|
| | Stepwise | Fresh Sediment |
| Benzene | 1.9 | 2.6 |
| Dioxane | 4.1 | 5.3 |
| Isopropanol | 7.9 | 9.9 |
| Nitromethane | 16.7 | 19.8 |
| | 30.6 | |

As indicated by this table, in comparing columns 1 and 2, essentially as much organic material is extracted by successive treatments of a 20 gram sediment sample as is separated from 80 grams of fresh sediment by the same volume of solvent when used individually on fresh 2-gram samples of the sediment. This data indicates that the solvents are selective in their extraction characteristics.

What is claimed is:

1. The process of extracting soluble organic constituents from solid sedimentary material containing a major portion of inorganic material and a minor portion of organic material comprising the steps of providing said solid sedimentary material in finely-divided form, contacting said material with a substantially greater weight of a liquid organic chemical in which said organic constituent is soluble, said chemical containing no aliphatic olefinic unsaturation and boiling in the range of about 30°–130° C., to form a mixture of said liquid organic chemical and finely-divided discrete particles of said solid sedimentary material, said mixture containing substantially more liquid than solid, and exposing said mixture to the action of compressional waves of sufficient intensity to cause cavitation in said liquid in said mixture.

2. The process defined by claim 1 in which the said solid sedimentary material constitutes a shale.

3. The process defined by claim 1 in which the said solid sedimentary material constitutes sediment deposited on the bottom of a body of water.

References Cited in the file of this patent

UNITED STATES PATENTS

| | | |
|---|---|---|
| 1,513,745 | Day | Nov. 4, 1924 |
| 1,794,865 | Pier et al. | Mar. 3, 1931 |
| 2,173,842 | Horner | Sept. 26, 1939 |
| 2,265,762 | McKittrick et al. | Dec. 9, 1941 |
| 2,367,664 | Campbell | Jan. 23, 1945 |
| 2,473,453 | Shropshire | June 14, 1949 |
| 2,601,635 | Romagnan | June 24, 1952 |

FOREIGN PATENTS

| | | |
|---|---|---|
| 457,547 | Great Britain | Aug. 26, 1935 |
| 508,675 | Great Britain | June 26, 1939 |